United States Patent
Lee

[11] 3,897,799
[45] Aug. 5, 1975

[54] HERMETIC SEAL ARRANGEMENT FOR SLEEVE VALVE

[75] Inventor: John T. M. Lee, Phoenixville, Pa.

[73] Assignee: ICI United States Inc., Wilmington, Del.

[22] Filed: Mar. 19, 1973

[21] Appl. No.: 342,779

[52] U.S. Cl. .................. 137/68; 137/70; 137/71; 220/89 A
[51] Int. Cl. .................. F16k 17/14; F16k 17/40
[58] Field of Search ............ 137/68, 70, 71, 72; 220/47, 89 A, 89 B; 251/190, 224, 225, 343, 344

[56] References Cited
UNITED STATES PATENTS

| 2,620,815 | 12/1952 | Margraf et al. | 137/70 |
| 3,016,015 | 1/1962 | Filstrup | 137/70 |
| 3,141,470 | 7/1964 | Fontaine | 137/68 |
| 3,260,272 | 7/1966 | Eckardt | 137/68 |
| 3,434,694 | 3/1969 | Skinner | 251/324 |
| 3,464,633 | 4/1969 | Potocnik | 137/68 |
| 3,478,760 | 11/1969 | Hosek | 137/68 |

*Primary Examiner*—Martin P. Schwadron
*Assistant Examiner*—George L. Walton

[57] ABSTRACT

An improved sealing arrangement in forming a hermetically sealed sleeve valve for use in high pressure gas service is presented wherein frangible sleeve rings are employed to perfect the seal. The arrangement is particularly suitable for quick opening explosively activated sleeve valves employed for the quick release of compressed gas needed for filling air bags in automobile passive restraint apparatus.

3 Claims, 10 Drawing Figures

HERMETIC SEAL ARRANGEMENT FOR SLEEVE VALVE

The present invention relates to a hermetically sealed sleeve valve arrangement particularly useful in quick opening explosively activated gas valves. In particular, the invention is directed to a sleeve ring seal arrangement comprising frangible rings hermetically sealed to the valve case. The arrangement provides a one-time quick opening valve offering a permanent seal for gases under high pressure.

It is the object of the invention to provide a valve sleeve having at least one frangible ring seal forming positive seal with the valve casing.

It is another object of the invention to provide multiple frangible ring arrangements to form a permanent seal between the valve casing and sleeve.

It is another object of the invention to provide a hermetically sealed valve for high pressure fluid control in which frangible sleeve ring seal arrangements are employed.

Further objects, advantages, and improvements of the valve seal arrangement of the present invention will be apparent from the following illustrative description of the invention taken in connection with the accompanying drawings wherein.

Figure 1:
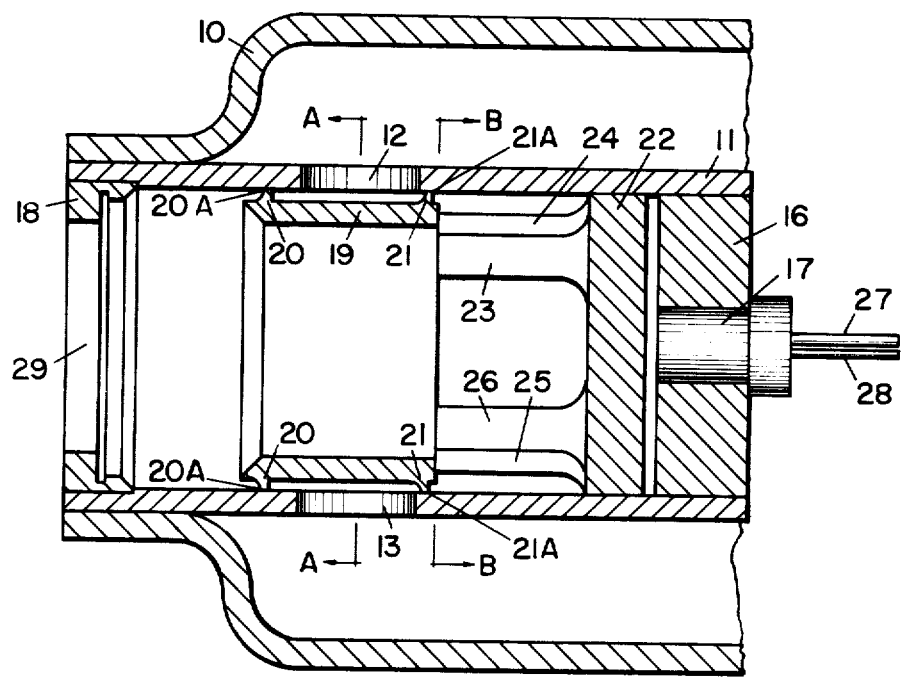
FIG. 1 is a longitudinal, sectional view of an embodiment of a sleeve valve employing the hermetic sleeve ring seals of the invention.

FIGS. 4, 6, 7, 8, and 9 are enlarged, fragmentary views showing alternate ring seal sleeve assemblies useful in FIG. 1.

Figure 5:
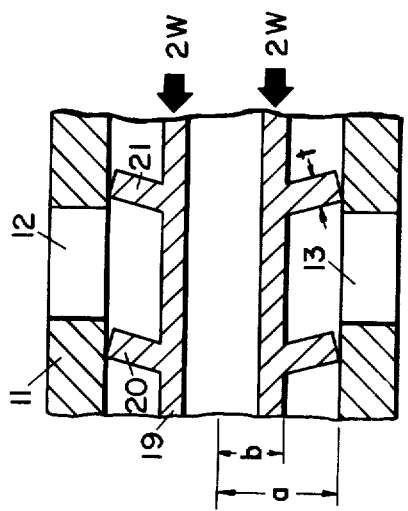
Figure 4:
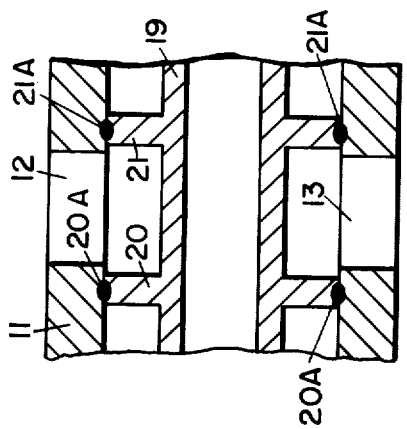

FIG. 5 is an enlarged, partial view of FIG. 4 showing sleeve ring seals which are opened by applied forces.

Figure 10:
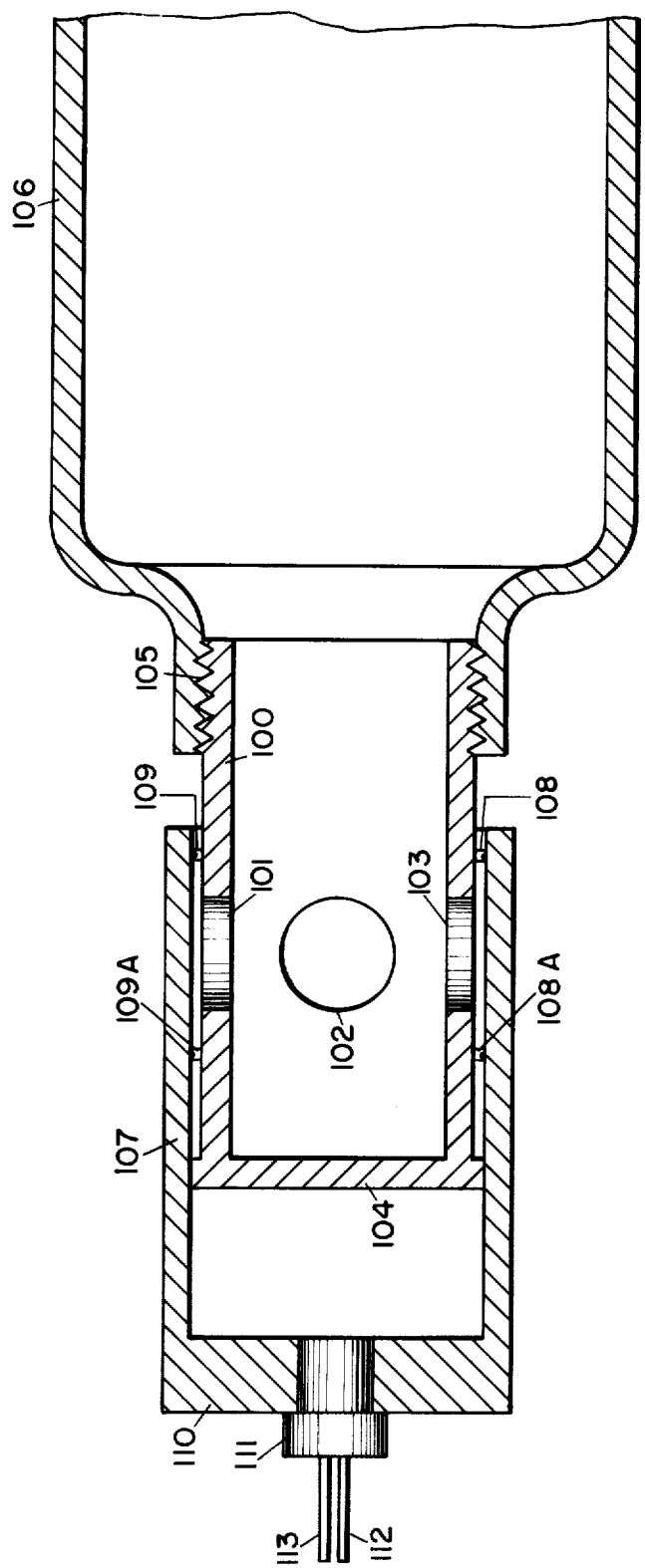

FIG. 10 is a longitudinal, sectional view of an embodiment of a sleeve valve employing a single sleeve ring seal arrangement of the invention.

The advantages offered by the invention can be better understood by referring to FIGS. 1 through 10 wherein similar parts are referred to by identical reference numbers.

Figure 2:
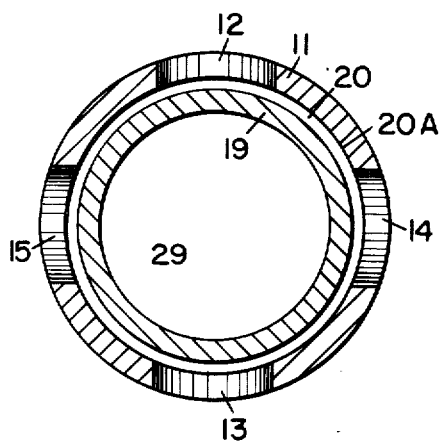
FIG. 2 is a cross-sectional view of a valve shown in FIG. 1 taken through Section A—A.
Figure 3:
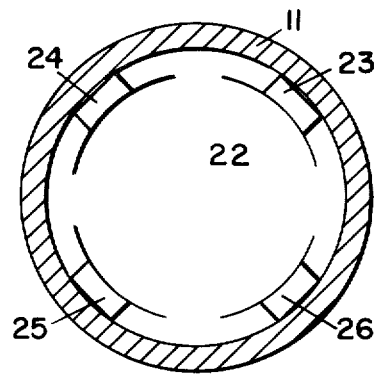
FIG. 3 is a cross-sectional view of a valve shown in FIG. 1 taken along Section B—B.

In FIGS. 1, 2, and 3 is shown a valve assembly of the invention inserted in the mouth of a high pressure vessel 10 containing fluid under pressure. The main components of the valve comprise a shell 11 in which are exit ports 12, 13, 14, and 15 closed by a sleeve 19. Shell 11 is closed by end piece 16 in which is inserted an electrically activated squib 17 containing an explosive or pyrotechnic gas generating material. At the opposite end of the valve shell is a sleeve stop end piece 18. Within the shell is mounted sleeve 19 having frangible sealing rings 20 and 21 hermetically sealed against the inner side of said shell 11 by brazing, welding, gluing, or any suitable means 20A and 21A, respectively, to stop the leakage of gas or fluid under high pressure located at ports 12, 13, 14, and 15. The valve further comprises a piston 22 with legs 23, 24, 25, and 26.

In operation, electrical current is applied to lead wires 27 and 28 to ignite squib 17 thereby creating sufficient force on piston 22 to drive legs 23, 24, 25, and 26 against the sleeve 19 breaking the seals 20A and 21A of the seal rings 20 and 21 thereby forcing the sleeve into stop piece 18 and permitting pressurized fluid from the container 10 to pass into the cavity of the shell through ports 12, 13, 14, and 15 and out through the mouth 29 of the fluid container 10.

In particular, the invention deals with the unique seal arrangement encompassing both sides of the exit ports 12, 13, 14, and 15 to form hermetic seals such that fluid under high pressure within the container 10 does not leak around the periphery of the sleeve ring in contact with the interior of shell 11 and ultimately through the opening 29. An important feature of the novel sleeve ring arrangement is that the valve can contain high pressure fluid in a container and yet be opened by a reasonably low force. Furthermore, an almost absolute seal is obtained because a valve and sleeve can be continuously bonded by frangible materials such as braze, solder, weld, glue, glass, plastic resin, and other compatible sealing materials. In some instances, the sleeve and ring components may be constructed from organic polymeric resins, glass and frangible alloys.

The operation and design of sleeve valve arrangements are better understood in examining FIGS. 4 and 5 in combination with the description supplied in the following example:

EXAMPLE 1

In reference to FIGS. 4 and 5, a valve arrangement is shown having a low carbon steel shell 11 having an inside radius a of 0.65 inches and outlet ports 12 and 13. Sleeve 19 having outside radius b of 0.606 inches and ring seals 20 and 21 having thickness t of 0.04 inches brazed at 20A and 21A (FIG. 4) with copper brazing material forms a hermetic seal with 4,000 psi pressure across the flange w isolating the openings 12 and 13. Opening forces W needed for moving the piston 22 shown in FIG. 1 can be calculated from these dimensions by using formulas provided by Cases 77 and 20 on pages 237 and 222, respectively, in Formulas for Stress and Strain, 4th Edition, by Raymond J. Roark, McGraw-Hill, 1965, New York, which are:

$$s_{r_1} = \beta \frac{wa^2}{t^2}$$

wherein
$\beta = .0056$
$s_{r_1}$ = radial bending stress on outside edge of the flange
$w$ = pressure across flange
$b$ = inside radius of flange
$a$ = outside radius of flange
$t$ = flange thickness
and $$s_{r_2} = \frac{3W}{2\pi t^2} \left[ 1 - \frac{2b^2}{a^2 - b^2} \left( \ln \frac{a}{b} \right) \right]$$

wherein
$W$ = force concentrated on inner periphery of the flange (i.e., opening force)
$s_{r_2}$ = ultimate strength of copper - 40,000 psi The bending stress $s_{r_1}$ on the outside edge of the flange at the copper braze joint amounts to 5,915 psi, due to the pressure of 4,000 psi.

It is, therefore demonstrated that the advantage of the arrangement lies in the fact that one can contain 4,000 psi pressure across the flanges or sleeve rings by stressing the braze to only a 5,915 psi bending stress $s_{r_2}$ and yet open the valve with a low 3,914 pounds of total force (2 × W) in the case where two seals are employed as shown in FIGS. 4 and 5. Such a valve arrangement is adequate for containing fluid under pressures of 3,600 psi and higher.

In FIGS. 6, 7, 8, and 9 are shown partial, sectional views of FIG. 1 showing alternate embodiments of the sleeve ring seal arrangements of the invention.

Figure 6:
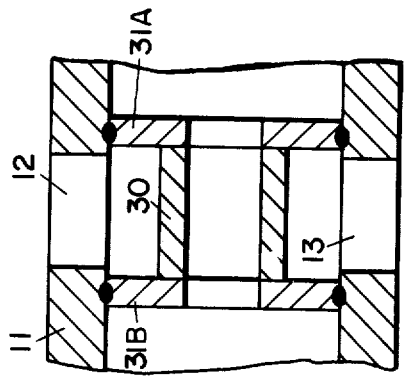

FIG. 6 shows a cylindrical sleeve 30 having on each end welded a washer 31A and 31B which are, in turn, sealed to the inside of shell wall 11.

Figure 7:
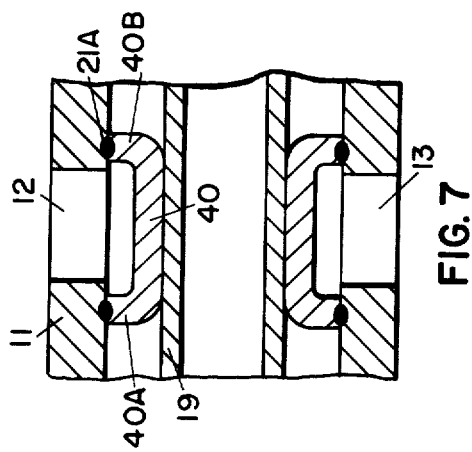

FIG. 7 shows valve shell 11 having openings 12 and 13 sealed by a fluted or swaged end spool 40 wherein the ends 40A and 40B of said spool are sealed to the inside of the wall of shell 11 to cover the outlet ports 12 and 13.

Figure 8:
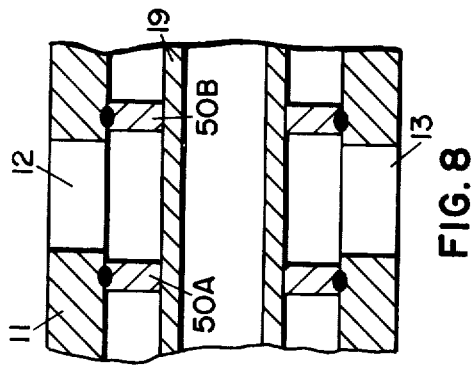

FIG. 8 shows the sleeve 19 sealed to the interior of shell 11 by rings 50A and 50B which are sealed on both sides to the interior of the shell 11 and the exterior of the sleeve 19.

Figure 9:
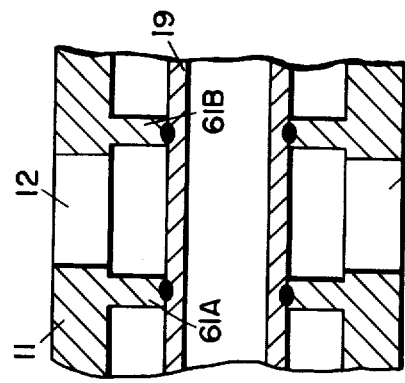

FIG. 9 shows another embodiment wherein permanently mounted interior rings 61A and 61B are sealed to slidable sleeve 19.

FIG. 10 shows another modification of a valve assembly wherein a shell 100 having outlet ports 101, 102, and 103 and another (not shown) and a sealed end closure 104 is screwed into the threaded mouth 103 of a pressurized fluid container 106. Sleeve 107 is mounted to said shell through sleeve ring seals 108 and 108A sealed at the shell's outer surface 109 and 109A. End closure 110 of the sleeve contains a squib 111 and squib leads 112 and 113.

In operation, electrical current is applied to squib 111 through lead wires 112 and 113 which applies force to end piece 110 lifting sleeve 107 and breaking sleeve ring seal 108 to uncover exit ports 101, 102, 103 and a fourth (not shown) to permit gas or fluid to escape from fluid container 106.

What is claimed is:

1. In a sleeve valve for containing high pressure fluid comprising a shell having a port therein, a closure across said shell, a sleeve slidable within said shell into separate positions in which said port is covered and uncovered, and operating means for applying force to slide said sleeve such that said port is uncovered to allow fluid to pass through said port through said sleeve, the improvement wherein said sleeve is sealed to said shell by at least 1 frangible sleeve ring flange seal having a thickness, internal radius and external radius, located on each side of said port continuously bonded to said shell and said sleeve such that pressurized fluid will not pass through said port when said slidable sleeve covers said port, said sleeve ring flange having a relatively small thickness compared with said shell and a sufficiently large inside/outside radius differential that the required force applied by said operating means to slide said sleeve and break said sleeve ring flange seals is less than the force required to shear said flanges by applying force along their outside radius.

2. A sleeve valve of claim 1 having a multiplicity of ports therein.

3. A sleeve valve of claim 1 wherein said operating means for applying said force is a squib.

* * * * *